June 24, 1958  H. G. SCHWARZ  2,840,130
JUICE EXTRACTORS
Filed April 12, 1956  2 Sheets-Sheet 1
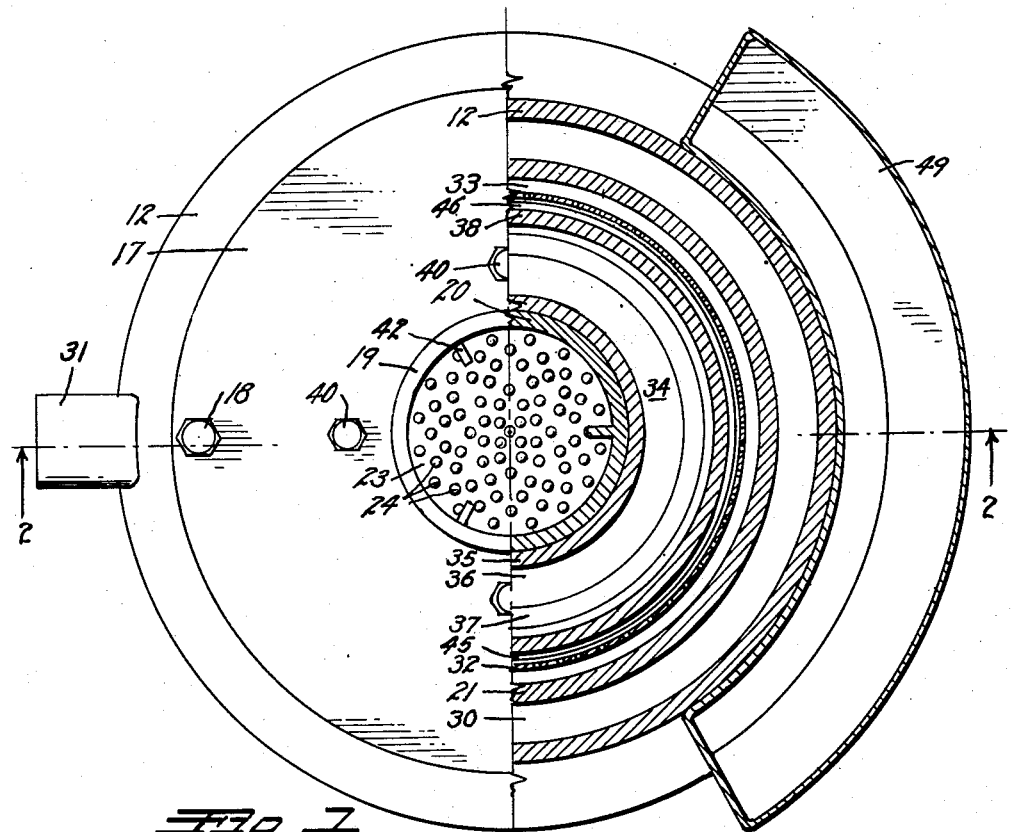
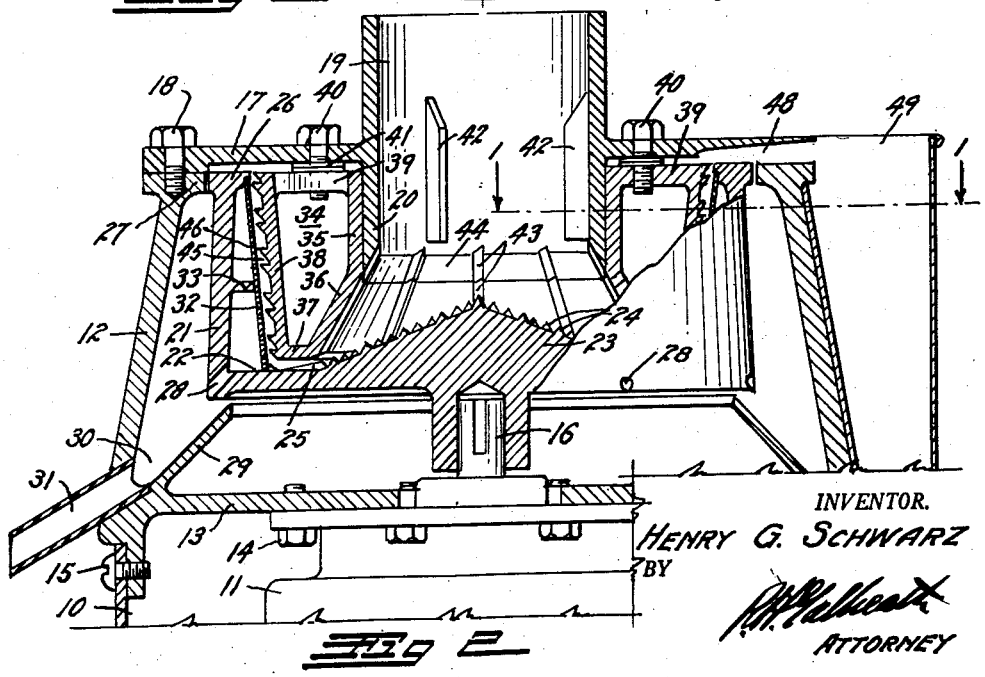
INVENTOR.
HENRY G. SCHWARZ
BY
ATTORNEY June 24, 1958     H. G. SCHWARZ     2,840,130
JUICE EXTRACTORS
Filed April 12, 1956     2 Sheets-Sheet 2
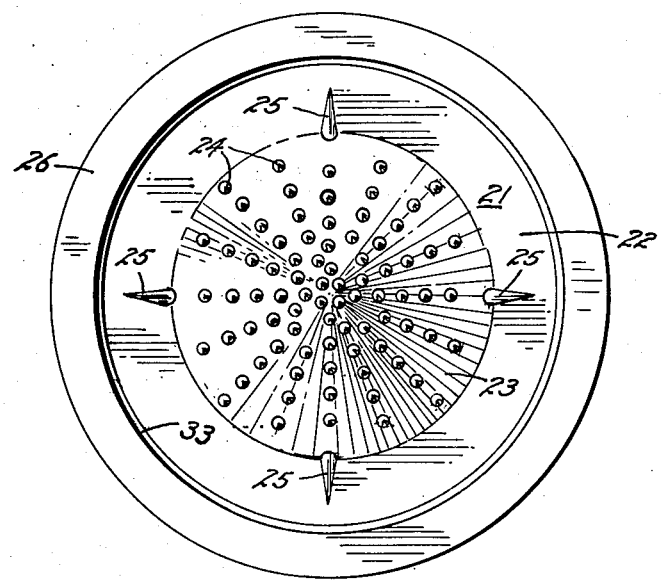
Fig. 3
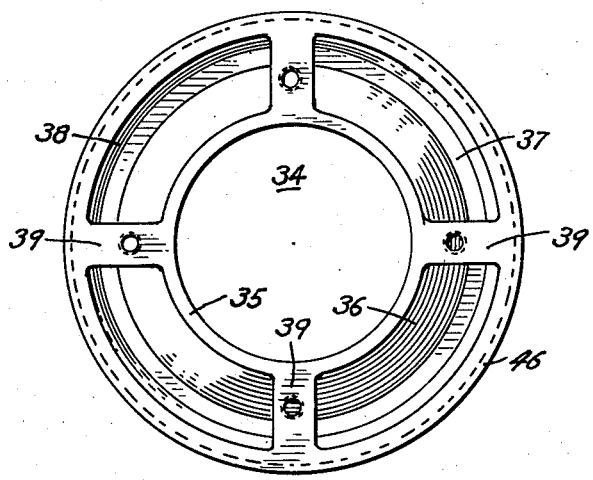
Fig. 4
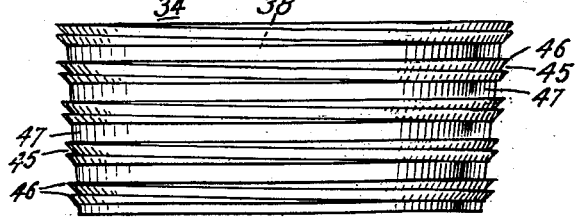
Fig. 5
INVENTOR.
HENRY G. SCHWARZ
BY
ATTORNEY United States Patent Office 2,840,130
Patented June 24, 1958

2,840,130

JUICE EXTRACTORS

Henry G. Schwarz, Menlo Park, Calif.

Application April 12, 1956, Serial No. 577,821

12 Claims. (Cl. 146—76)

This invention relates to a motor driven juice extractor of the type illustrated and described in applicant's copending application Serial No. 468,768, now Patent No. 2,799,313. The improved extractor is more particularly designed for use on vegetables and fruits, but will be found valuable wherever it is desired to extract fluids from solid materials.

The principal object of the invention is to provide a highly efficient juice extractor by the use of which a high percentage of juice will be extracted, and to provide a juice which will be clear and free from solids and sediment.

Another object is to provide a juice extraction device which can be used in a light-weight portable table model for household use or which can be incorporated in a large-capacity, continuously-operating commercial extractor which will be economical in power consumption, light in weight, long wearing, trouble free, non-clogging, highly efficient, and exceedingly rapid in operation.

A further object is to provide an extractor which will protect the extracted juices from excess oxidation so as to minimize vitamin losses and discoloration and spoilage.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a combined top view and horizontal section of the improved juice extractor, the sectional portion being taken on the line 1—1, Fig. 2;

Fig. 2 is a cross section through the upper portion of the improved extractor, taken on the line 2—2, Fig. 1;

Fig. 3 is a detail top view of a rotor employed in the improved extractor;

Fig. 4 is a detail top view of a stator employed in the improved extractor; and

Fig. 5 is a similar detail side view of the stator of Fig. 4.

The improved extractor is mounted on a suitable motor housing 10 of any suitable design for enclosing an electric motor 11. Since the lower portions of the housing 10 and motor 11 form no part of the present invention, they have been cut away in Fig. 2. The improved extractor is enclosed in a somewhat conical outer hood 12 arranged to be mounted upon the housing 10 in any desired manner such as by means of suitable attachment screws 15. The hood 12 is provided with a bottom plate 13 to which the motor may be secured in any desired manner, such as by means of suitable cap screws 14 so that the motor shaft, indicated at 16, will project vertically into the hood 12. The top of the hood 12 is closed by means of a circular top plate 17 secured therein by means of (preferably three) suitable cap screws 18. The top plate 17 is provided with an axially positioned, upwardly extending tubular feed neck 19 into which the material to be dejuiced is fed. The neck 19 is formed with a cylindrical skirt portion 20 which projects downwardly from the top plate 17 into the hood 12. A plurality of product baffles 42 are formed in the neck 19 and skirt portion 20. The lower edge of the skirt portion 20 is bevelled outwardly as shown at 44.

A bowl-shaped rotor 21 is fixedly mounted upon the upwardly extending motor shaft 16 within the hood 12. The upper surface of the bottom of the rotor 21 comprises a relatively flat annular peripheral portion 22 surrounding a concentric conical central portion 23 having an incline of substantially 30°.

The conical central portion 23 of the rotor is provided with a plurality of relatively sharp conical shredding teeth 24 and the periphery of the cone is formed with radially extending tapered ridges 25, four being illustrated. The side wall of the rotor 21 extends sharply upward and inward from the periphery of the circular bottom thereof. A widened top flange 26 is formed about the upper edge of the circular side wall of the rotor 21 which rotates in close proximity to the inner edge of a similar top flange 27 formed on the hood 12. A plurality of inclined juice ports 28 are formed about the lower edge of the wall of the rotor to discharge juice from the bowl-shaped rotor. An inclined drip flange 29 is formed about the periphery of the bottom plate 13 to form an annular juice channel 30 within the hood 12 from which the juice is discharged through one or more juice spouts 31.

An endless, perforated, band-like screen 32 is positioned within and in close proximity to the peripheral wall of the rotor 21. The upper edge of the screen 32 is inset in a groove in the flange 26 and the lower edge of the screen 32 rests upon the flat annular portion 22 of the bottom of the rotor. The screen 32 inclines outwardly as the top is approached and it is held in rigid spaced relation to the rotor wall by means of a spacing ridge 33 formed on the rotor wall. A hollow, annular stator, as shown in Figs. 4 and 5, and designated in its entirety by the numeral 34, is secured to the top plate 17 of the hood 12 and extends downwardly within the enclosure of the rotor wall. The stator 34 is somewhat V-shaped in cross-section having an inner upper cylindrical portion 35, which is slidably fitted about the downwardly projecting skirt portion 20 of the neck 19; a conical inner wall 36, of steeper incline than the conical portion 23 of the rotor; a bottom portion 37; and an outwardly inclined annular outer wall 38. Four equally-spaced spoke members 39 extend between the cylindrical portion 35 and the outer wall 38. A cap screw 40 is threaded into each spoke member. The cap screws 40 extend through the top plate 17 and serve to secure the stator to the top plate against suitable spacing shims 41. The cap screws 40 and the shims 41 are accurately adjusted to position the outer surface of the inclined outer wall 38 parallel to and in close proximity to the surface of the screen 32 and to position the stator bottom 37 in close proximity to the rotor ridges 25.

A plurality of vertically extending, spaced-apart masticating grooves 43 are formed in the conical inner surface of the conical inner wall 36 of the stator extending the entire vertical height of the said inner wall. These grooves are ratchet-shaped in cross-section so as to provide an abrupt radial, flat side against which the product is thrown by the rotating rotor. The masticating grooves 43 are in alignment with similar grooves formed in the bevelled bottom edge 44 of the skirt portion 20 to form continuous grooves in both elements.

Continuous V-shaped grooves 45 are cut in a continuous spiral in the outer surface of the outer stator wall 38.

The groove 45 is so formed as to provide a lower groove wall substantially horizontal in cross section and an inclined (approximately 30°) upper groove wall to form a sharp spiral ridge or thread 46, the turns of the spiral ridges being positioned in close juxtaposition. When assembled, the outer circumference of the spiraled ridge 46 is positioned in close proximity to the surface of the screen 32.

The continuous spiral ridge 46 would form a thread-like surface on the stator, the incline of which would tend to continuously force rotating pulp upwardly. To retard the upward travel of the pulp in order to obtain a more efficient juice extraction from certain materials the continuous thread of the spiral ridge 46 is interrupted by a plurality of parallel annular grooves 47 which separate the continuous spiral into a series of spaced-apart spirals as shown in Fig. 5.

An arcuate pulp passage 48 is formed in the edge of the top plate 17 extending over the top flange 27 of the hood 12 for approximately ⅓ of its circumference and extending radially inward over the space between the stator and the rotor. As illustrated, the pulp passage 48 discharges into a pulp cup 49 mounted on the exterior of the hood 12 in any desired manner.

OPERATION

Let us assume that the improved extractor is to be used for extracting a vegetable juice and that the motor 11 is rotating the rotor 21 in a clockwise direction.

The vegetables are piled into and forced downwardly in the neck 19 to force the packed vegetable particles against the rapidly rotating rotor with the baffles 42 and the grooves 43 acting to prevent rotation of the vegetable mass. The vegetable matter is rapidly converted into a finely divided, juice-releasing, pulp by the shredding action of the teeth 24 and the agitated mass is forced radially outward by the diverting action of the conical mid-portion of the rotor and by centrifugal force. It will be noted that the conical inner wall 36 of the stator and the inclined surface of the rotor gradually approach each other so that pulp is subjected to a continuous squeezing action as it approaches the space between the bottom portion 37 of the stator and the flat portion 22 of the rotor so that it passes through the latter under exceedingly high pressure to extract the juice therefrom. The extraction is assisted by the masticating action of the grooves 43 against the compressed rotating pulp mass.

The pulp and juice discharging beneath the stator bottom 37 is now thrown centrifugally outward against the screen 32 and the juice flows through the screen and is thrown through the ports 28 into the juice channel 30. The rotating mass of pulp, however, is spread upwardly over the screen 32 by the action of the spiral ridges 46 into a thin rapidly rotating pulp wall from which the last remaining juice is extracted by centrifugal force. The thin pulp wall gradually moves upwardly and discharges between the rotor and the stator into the pulp passage 48 and from thence into the pulp cup 49 in a dry saw-dust-like condition.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A juice extractor comprising: a bowl-shaped rotor mounted on the upper extremity of a vertical motor shaft; a circular bottom in said rotor; a substantially cylindrical rotor side-wall arising from the periphery of said bottom, there being juice ports communicating between the interior and exterior of said rotor adjacent the periphery of said bottom; material pulping means on the upper mid-portion of said bottom; an endless annular band screen positioned in and secured to said rotor in spaced relation to said side wall and extending from the top of the latter to said bottom; and an annular stator concentrically mounted over said bottom within the enclosure of said screen, said stator being closely spaced relative to said screen and to said bottom and provided with helical ridges thereabout, said screen acting to trap a relatively thin, rotating, annular wall of pulp about said stator to express the juice, and acting to urge the pulp to move upwardly along said ridges toward a discharge exit.

2. A juice extractor as described in claim 1 wherein said ridges form spirally-arranged projections on the outer surfaces of said stator against which said pulp wall contacts as it rotates so that said spirally-arranged projections will act to urge said pulp upwardly over the top of said rotor side-wall.

3. A juice extractor as described in claim 2 having radial ridges formed on said bottom below said stator to sweep pulp from the space between the stator and said bottom.

4. A juice extractor as described in claim 3 having a tubular feed neck extending downward within said stator; a conical inner wall on said stator inclining downwardly and outwardly from said feed neck to direct material from the latter to the space between said bottom and said stator.

5. A juice extractor as described in claim 4 having masticating grooves formed in the inner surface of said conical inner wall for masticating pulp rotating with said rotor.

6. A juice extractor as described in claim 5 having means for vertically adjusting said stator to regulate the space between the latter and said bottom.

7. A juice extractor as described in claim 6 having an annular stationary juice trough positioned below said rotor and positioned to receive juice from said juice ports.

8. A juice extractor as described in claim 7 in which the material pulping means comprises: a cone-shaped medial-portion on said bottom having its apex in axial alignment with said feed neck and a plurality of relatively sharp teeth formed on said cone-shaped medial portion.

9. A juice extractor comprising: a motor housing; a hood mounted on said housing; an electric motor mounted within said housing with its motor shaft extending concentrically upward into said hood; a circular rotor fixedly mounted on said motor shaft; a cylindrical rotor wall formed on and extending upwardly about the periphery of said rotor and terminating in substantial alignment with and in close proximity to the upper edge of said hood, said wall being provided with juice ports; an annular perforated endless-band-like screen for screening pulp from the juice, said screen being mounted on said rotor in closely spaced relation to the rotor wall; a top plate closing said hood; means extending downwardly through said top plate for feeding material onto said rotor; a stator suspended from said top plate within said rotor wall, the bottom of said stator terminating in close proximity to said rotor; an outer annular stator wall on said stator uniformly spaced slightly from said screen to form a restricted annular passage thereabout; upwardly inclined means on said outer stator wall acting against the pulp rotating with said screen to urge said pulp upwardly on said screen, said screen inclining outwardly as it approaches the top of said rotor wall and said stator wall similarly inclining upwardly and outwardly so that centrifugal force will assist in urging said pulp upwardly on said screen, the said means on the stator wall which acts against the rotating pulp consists of a screw-like thread formed on the exterior surface of said stator wall, the pitch of said thread being such as will act to urge the rotating pulp upwardly on said screen and over the top of said rotor wall.

10. A juice extractor as described in claim 9 having a pulp discharge passage formed in said hood in substantial horizontal alignment with the top of said rotor wall to receive the pulp discharging thereover; and means for receiving the pulp from said passage.

11. A juice extractor as defined in claim 1, in which said ridges about said stator are formed by spiral threads, a cross section of the threads showing the upper wall of the threads extending horizontally and the lower wall thereof inclined inwardly toward the base of the threads.

12. A juice extractor as defined in claim 1, in which said ridges about said stator are formed by spiral threads thereabout, said threads being interrupted at spaced intervals by annular parallel horizontal grooves, forming parallel annular passages for retarding the upward travel of the pulp.

References Cited in the file of this patent

UNITED STATES PATENTS

| | | |
|---|---|---|
| 2,311,379 | Gillanders | Feb. 16, 1943 |
| 2,481,010 | Gundelfinger | Sept. 6, 1949 |
| 2,510,420 | Ross | June 6, 1950 |
| 2,573,585 | McBean | Oct. 30, 1951 |